United States Patent [19]

Olschewski et al.

[11] 4,270,815

[45] Jun. 2, 1981

[54] ROLLER BEARING

[75] Inventors: Armin Olschewski, Schweinfurt; Manfred Brandenstein, Eussenheim; Lothar Walter, Schweinfurt; Horst M. Ernst, Eltingshausen; Heinrich Kunkel, Schweinfurt, all of Fed. Rep. of Germany

[73] Assignee: SKF Kugellagerfabriken GmbH, Schweinfurt, Fed. Rep. of Germany

[21] Appl. No.: 52,729

[22] Filed: Jun. 28, 1979

[30] Foreign Application Priority Data

Jul. 13, 1978 [DE] Fed. Rep. of Germany ....... 2830818

[51] Int. Cl.[3] ........................ F16C 19/24; F16C 33/58

[52] U.S. Cl. .................................... 308/213; 308/216; 308/DIG. 11

[58] Field of Search ................... 308/202, 207 R, 210, 308/212, 213, 216, DIG. 11

[56] References Cited

U.S. PATENT DOCUMENTS

| | | | |
|---|---|---|---|
| 1,194,043 | 8/1916 | Laycock | 308/213 |
| 1,247,288 | 11/1917 | Laycock | 308/213 |
| 1,970,449 | 8/1934 | Gibbons et al. | 308/212 |
| 2,856,247 | 10/1958 | Anderson | 308/212 |
| 3,230,023 | 1/1966 | Dahl et al. | 308/216 |

FOREIGN PATENT DOCUMENTS

| | | | |
|---|---|---|---|
| 213162 | 6/1960 | Austria | 308/210 |
| 511962 | 1/1921 | France | 308/213 |
| 269274 | 10/1950 | Switzerland | 308/212 |
| 395604 | 7/1933 | United Kingdom | 308/216 |

*Primary Examiner*—Richard R. Stearns
*Attorney, Agent, or Firm*—Eugene E. Renz, Jr.

[57] ABSTRACT

An edge ring adapted to be mounted in an annular groove adjacent one axial end of a bearing ring. The edge ring is slit in at least one location about its periphery to define a separation joint. An insert member engages in the separation joint and is secured to the bearing ring to seat the edge ring in the annular groove. A bearing comprising inner and outer rings and a plurality of rolling elements in the annular space between the rings and at least one edge ring mounted in an annular groove at one axial end of one of the rings slit at least at one location to define a separation joint and including an insert member engaging in the separation joint and secured to the bearing ring to seat the edge ring in the annular groove.

19 Claims, 5 Drawing Figures

2 10ª 11ª 17 10 11 15 14 14 16 5 8 9 3 6 4 1 7 12

22
21

15'
20
12
A
A
15 b
18 a
14'
19

ROLLER BEARING

BACKGROUND OF THE INVENTION

The present invention relates to roller bearings and particularly to a novel edge ring which is slit at least at one location about its periphery and is insertable in a correspondingly shaped annular groove of one of the rings of the bearing.

The edge or shoulder rings of roller bearings are made as separable elements from the bearing rings for various necessary reasons. For example, the machining of the races is simpler and less expensive. In cylindrical roller bearings, the raceway surfaces can be ground continuously. The separate edge or shoulder ring also simplifies assembly and disassembly of the elements of the bearing.

Roller bearings are known wherein the separately made edge rings are inserted in grooves in the bearing rings. These edge rings are constructed as either closed rings which are radially expanded or compressed as exemplified in U.S. Pat. No. 2,449,943. In other cases the edge rings are preformed in the nature of cup springs for insertion into the groove and are then after assembly again brought to a flat state. This construction is shown in German Pat. No. 1,105,691. U.S. Pat. No. 1,970,449 shows edge rings which are slit so that they can be compressed with a suitable tool and then slipped over the edges of the annular groove.

A roller bearing having inserted rims is also known wherein the shoulder of the bearing ring located in front of the annular groove is provided with recesses distributed about its periphery and the edge ring is provided with corresponding projections. The edge ring in this type of arrangement seats in the bearing ring with a bayonet type locking arrangement. This construction is illustrated in French Pat. No. 511,962.

With the foregoing in mind, the present invention provides a roller bearing with inserted edge rings characterized by novel features of construction and arrangement facilitating ease of assembly and disassembly even in large bearing sizes. The edge rings of the present invention are of relatively simple design which can be easily manufactured and are capable of absorbing relatively high axial forces. The edge rings are capable of being firmly secured in the annular groove against rotation thereby obviating damage to the annular groove in the seating surface during installation and removal.

BRIEF DESCRIPTION OF THE DRAWINGS

These and other objects of the present invention and the various details of the operation and construction thereof are hereinafter more fully set forth with reference to the accompanying drawings wherein.

DESCRIPTION OF THE PREFERRED EMBODIMENTS

Figure 1:
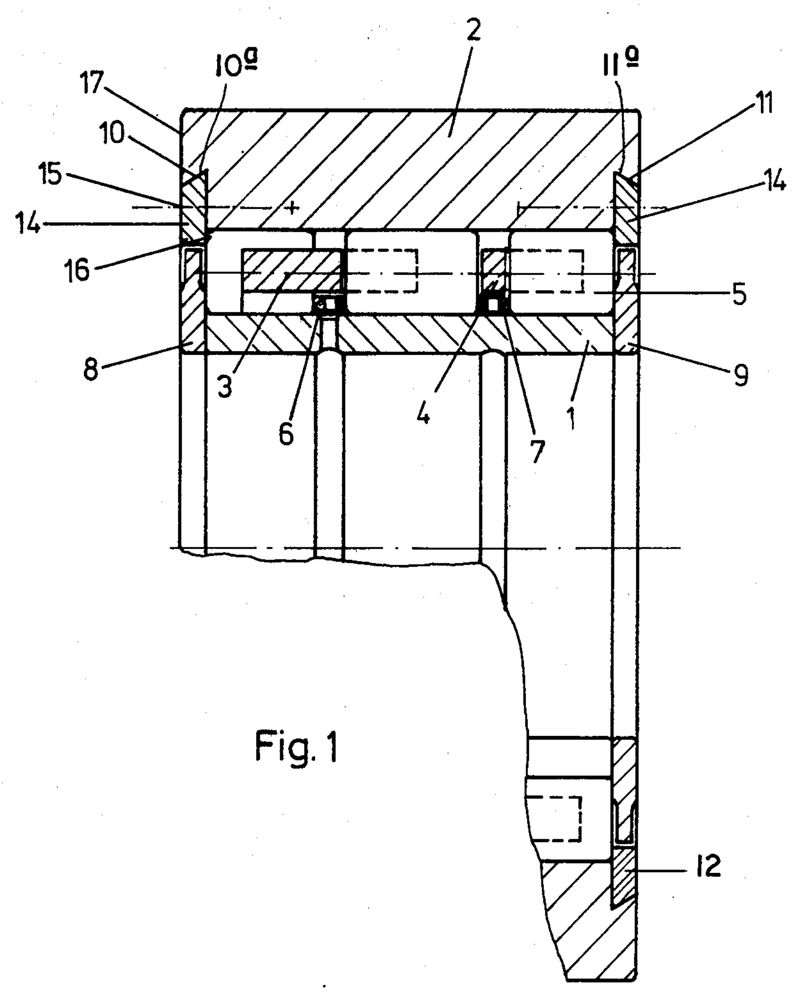
FIG. 1 is a fragmentary transverse sectional view through a roller bearing incorporating edge rings constructed in accordance with the present invention.

Referring now to the drawings, and particularly FIG. 1 thereof, there is illustrated a roller bearing assembly incorporating an edge ring design in accordance with the present invention. The roller bearing as illustrated comprises an inner ring 1, an outer ring 2 and a plurality of rolling elements, in the present instance, cylindrical rollers 5 in the annular space between the bearing rings which are separated and guided by conventional cages 3 and 4. In the present instance the cylindrical rollers 5 are arranged in three side by side axially spaced rows. Rims 6 and 7 mounted on the inner ring are provided between the rows of rollers and loose rim discs 8, 9 are provided at opposite axial ends of the inner ring which confront the axial end faces of the rollers of the two outer rows.

Figure 2:
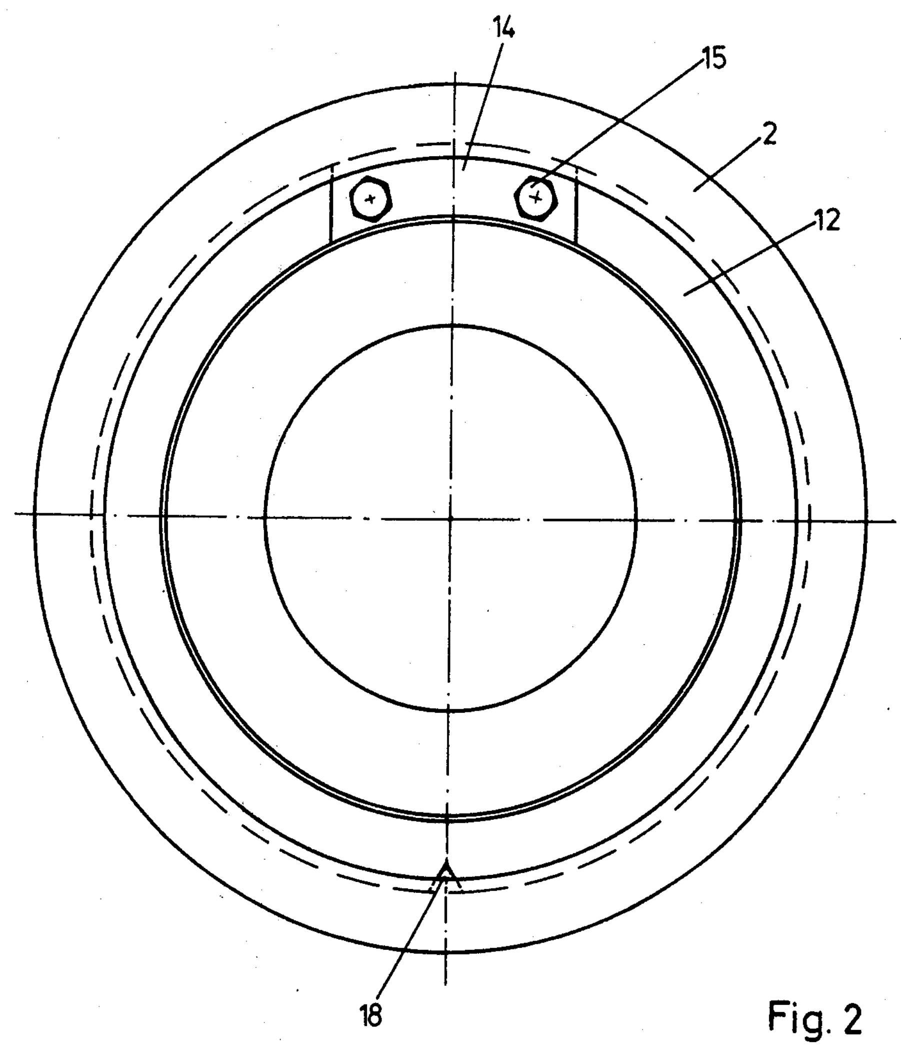
FIG. 2 is a side elevational view of the roller bearing of FIG. 1.

Edge rings 12 are mounted in annular grooves 10 and 11 at opposite axial ends of the outer ring 2. These edge rings are slit at one location on the periphery as can best be seen in FIG. 2 to accommodate an insert 14 which fits between the outer terminal end faces of the separation joint of the edge ring. The insert 14 is secured by means of screws 15 to the outer ring of the bearing. As best illustrated in FIG. 2, the insert 14 fills and closes the gap formed by the separation joint of the edge ring, serves as a brace of the edge ring and prevents rotation of the edge ring in relation to the outer ring 2. The edge ring 12 and insert 14 as illustrated project beyond the inner peripheral edge of the outer ring 2 and form a closed edge guiding surface 16 facing the inside of the bearing against which the outer axial end faces of the rollers 5 of the two outermost rows of rollers run axially to receive the axial forces transmitted from the rollers.

The edge ring is provided with a cut out or recess 18 at a location diametrically opposite the separation joint to define an area of smaller cross section providing a hinge to deform the edge ring for the purpose of inserting it into the annular grooves 10 and 11. The annular groove in opposite axial ends of the outer ring has a conically shaped base 11*a* which diverges outwardly relative to the axial end face 17 of the outer ring. The outer peripheral face of the edge ring and insert are of a complementary shape to seat snugly in the pocket or recess in the outer ring.

A bearing assembly incorporating an edge ring design of the present invention is assembled in the following manner: the cages 3 and 4 and the rims 6 and 7 are placed on the inner ring. The rollers 5 for the three rows of rollers are then snapped into place into the cages. The outer ring 2 may then be slipped over the subassembly comprising the inner ring 1 and rollers 5. Prior to assembly of the outer ring 2, one of the edge rings and inserts may be assembled to the outer ring before slipping it in place over the inner ring and roller subassembly. Then the second edge ring at the opposite axial end of the outer ring is assembled into its corresponding groove. The edge ring is assembled by compressing it slightly in a radial direction whereby it deforms uniformly about the cut out or recess 18. Once seated in the groove it flexes outwardly to fill the groove. The insert 14 is then slipped into place to fill the separation joint of the edge ring and securely connected to the outer ring by means of the screws 15. Disassembly which may be necessary for example for finishing of the casing of the outer ring or of the races is done in a reverse sequence. Disassembly may also be occasioned by damage to the rolling elements or cages. Thus, first the screws 15 are removed to free the insert 14. The edge ring can then be easily removed from the groove by slight compression radially inwardly. The outer ring 2 can then be pulled from the inner ring 1 together with the rollers 5.

Figure 3A:
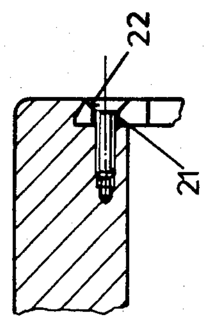
FIG. 3*a* is an enlarged fragmentary sectional view taken on lines A—A of FIG. 3.
Figure 3:
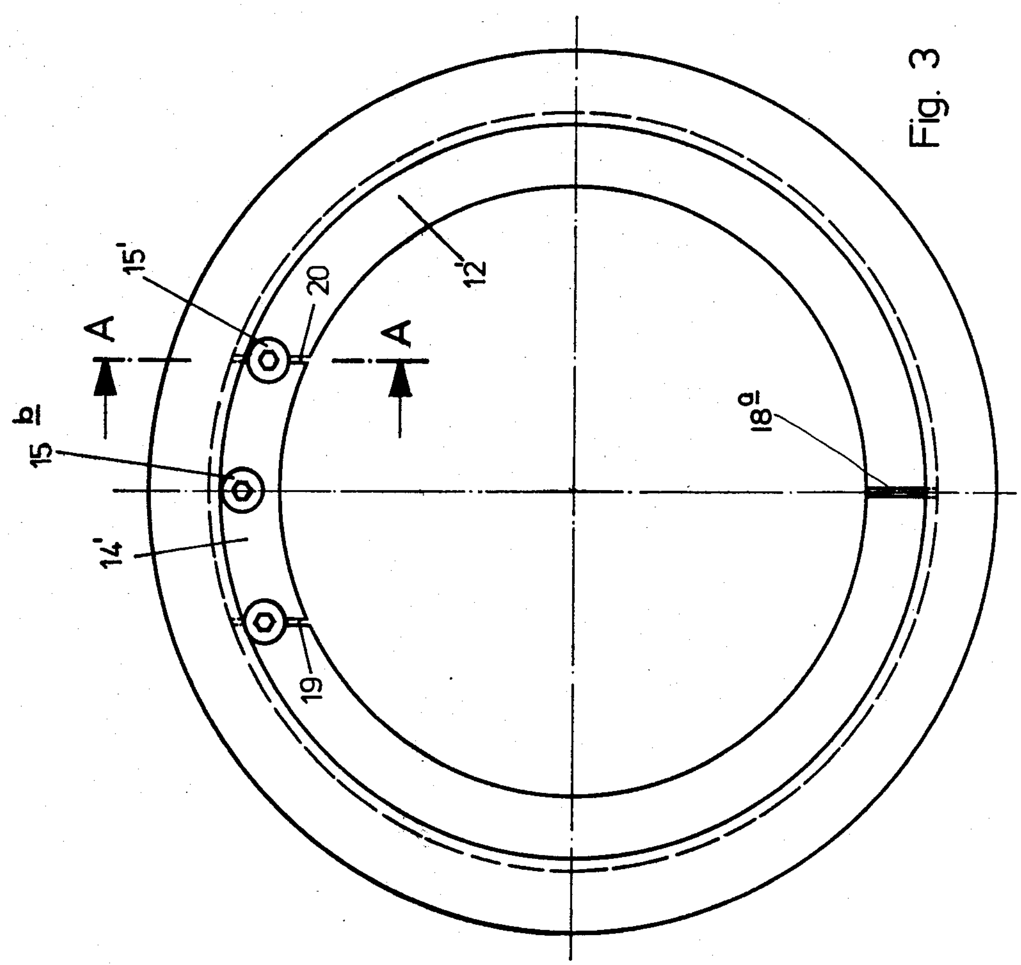
FIG. 3 is a side elevational view of a roller bearing incorporating a modified embodiment of edge ring design in accordance with the present invention.

FIG. 3 shows a modified form of edge ring design in accordance with the present invention. The parts of the assembly of FIG. 3 which are identical to the previously described embodiment are assigned the same reference numerals with a prime superscript. This embodiment is generally similar to that described above except that the fastening screws for the insert are arranged at the seam or joints 19 and 20 between the insert 14′ and the edge ring 12′. The fastening screws 15′ as well as the bore holes 21 are designed with a conical seat 22 (FIG. 3*a*). As the result of increased or decreased tightening of the screws 15′, the insert 14′ and the edge ring are pressed apart and clamped down into the annular groove. To this end the separation joints between insert 14′ and edge ring are designed with an incline. In this embodiment the edge ring is separated by slits or breaks 18*a* at the location diametrically opposite the insert 14′. As a result of these slits or breaks, the installation of the edge ring is made substantially easier especially in bearings having large diametral dimensions. An additional fastening screw 15*b* may be utilized located approximately at the center of the insert which prevents the insert from bending through shifts in a peripheral direction.

Figure 4:
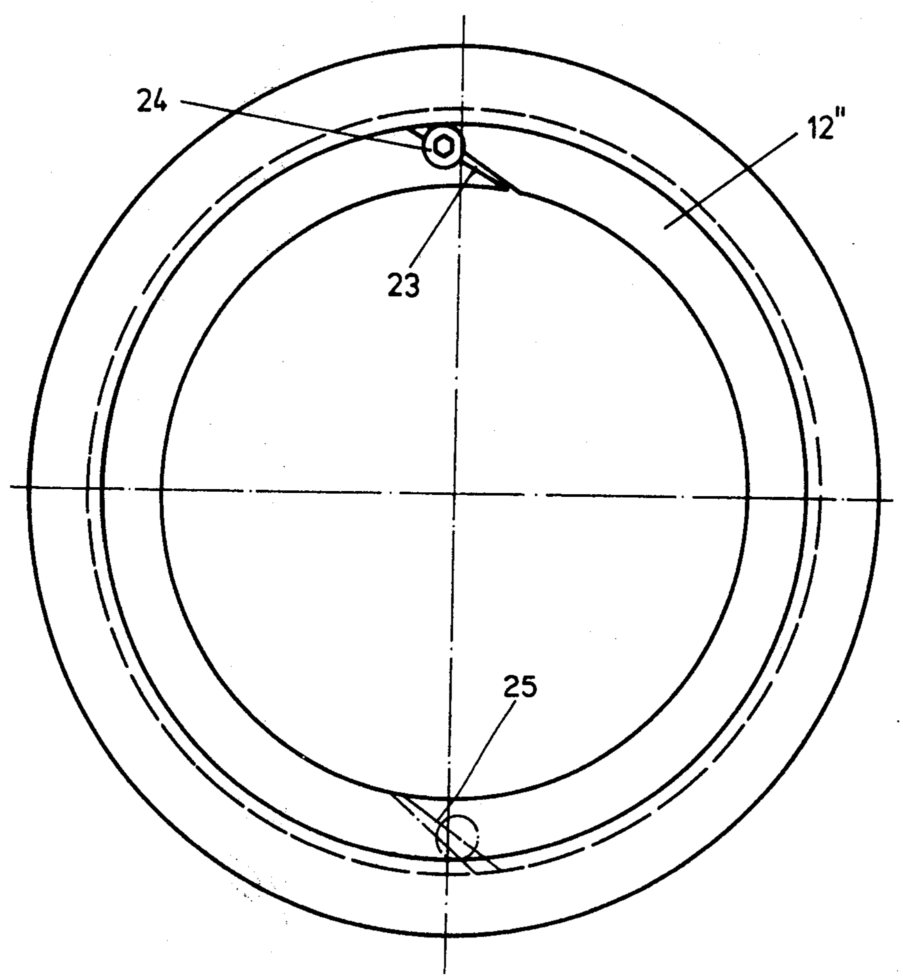
FIG. 4 is a side elevational view of still a further modification of edge ring designed for a roller bearing in accordance with the present invention; The term edge ring as used herein may alternatively be described in the art as a flange ring, shoulder ring or end washer.

There is illustrated in FIG. 4 a further modification of the edge ring assembly in accordance with the present invention. The parts of this assembly which are substantially identical to those of the previously described assembly are designated with the same numerals with superscripts. In this instance the edge ring is slit at a location on its periphery by an inclined or biased separation joint 23. A screw 24 engages in the separation joint to lock it against rotation relative to the outer ring. The screw 24 has a conical head section as a result of which the edge ring 12″ is pried open during turning of the screw inwardly and braced in the groove in the outer ring. It is also possible to construct the edge ring in two separate sections of semi-circular configuration so that it has two separation joints, one at 23 and the other indicated in broken lines at 25.

Even though specific embodiments of the present invention have been illustrated and described herein, it is not intended to limit the invention and changes and modifications may be made therein within the scope of the following claims. For example, each edge ring may be made in several parts. The edge ring and insert can initially be made from a closed ring and the separate elements may be done by breaking the ring along grooves or notches formed in the area of the desired separation lines. Additionally while the edge ring design has been shown in connection with multi-row cylindrical roller bearings, it is to be understood that it has useful application in other types of bearings wherein one edge or shoulder ring must be constructed separately from the actual bearing ring.

What is claimed is:

1. An edge ring adapted to be mounted in an annular groove in at least one of the bearing rings of a roller bearing, said edge ring being slit in at least one location about its periphery to define a separation joint and an insert member disposed between the confronting ends of the separation joint of the edge ring connected to the bearing ring and operable to seat the edge ring in the annular groove.

2. An edge ring assembly as claimed in claim 1 wherein the insert member is a screw.

3. An edge ring assembly as claimed in claim 2 wherein the screw has a conical shaft section.

4. An edge ring assembly as claimed in claim 1 wherein said insert member is a ring section fastened to the bearing ring by means of a plurality of screw members.

5. An edge ring assembly as claimed in claim 4 wherein the screw members for the insert are located between the edge ring and the opposite ends of the insert member.

6. An edge ring assembly as claimed in claim 5 wherein the screw members for the insert member and corresponding bore holes between the insert and the edge ring are of a conical configuration.

7. An edge ring assembly as claimed in claim 1 wherein the edge ring is weakened at a location diametrically opposite the separation joint.

8. An edge ring assembly as claimed in claim 1 wherein the edge ring is separated at a location diametrically opposite the separation joint.

9. An edge ring assembly as claimed in claim 1 wherein the insert and the edge ring are formed by a single closed ring having predetermined weakened areas to allow separation along the weakened areas to define the separate edge ring and insert member.

10. An edge ring assembly as claimed in claim 9 wherein the edge ring is separated along the weakened portions by breaking.

11. The combination of the bearing assembly comprising inner and outer rings spaced apart to define an annular space therebetween, a plurality of rolling elements in the annular space between the rings and an edge ring mounted in an annular groove in at least one of the bearing rings, said edge ring being slit in at least one location about its periphery to define a separation joint and an insert member disposed between the confronting ends of the separation joint of the edge ring connected to said one bearing ring and operable to seat the edge ring in said annular groove.

12. The combination as claimed in claim 11 wherein the insert member is a screw.

13. The combination as claimed in claim 11 wherein said insert member is a ring section fastened to the bearing ring by means of a plurality of screw members.

14. The combination as claimed in claim 11 wherein the edge ring is weakened at a location diametrically opposite the separation joint.

15. The combination as claimed in claim 11 wherein the edge ring is separated at a location diametrically opposite the separation joint.

16. The combination as claimed in claim 11 wherein the insert and the edge ring are formed by a single closed ring having predetermined weakened areas to allow separation along the weakened areas to define the separate edge ring and insert member.

17. The combination as claimed in claim 11 wherein said annular groove is located in the outer ring adjacent at least one axial end thereof and has a conically shaped base which diverges outwardly relative to the axial end face of the outer ring.

18. The combination as claimed in claim 17 including an edge ring at opposite axial ends of said outer ring which project radially inwardly beyond the inner peripheral surface of said outer ring to confront at least a portion of the axial end faces of said rolling elements.

19. The combination as claimed in claim 18 including rim discs at opposite axial ends of said inner ring which confront at least a portion of the axial end face of the rolling elements.

* * * * *